United States Patent [19]

Kim

[11] Patent Number: 4,494,713
[45] Date of Patent: Jan. 22, 1985

[54] SHOCKCONE AND CHANNELED DISK-AIRFRAME

[76] Inventor: Kyusik Kim, 5026 Rhoads Ave., Santa Barbara, Calif. 93111

[21] Appl. No.: 391,577

[22] Filed: Jun. 24, 1982

[51] Int. Cl.³ .......................... B64C 1/16; B64C 23/04
[52] U.S. Cl. ..................... 244/15; 244/12.1; 244/36; 244/130; 244/55
[58] Field of Search ...................... 244/15, 23 C, 12.1, 244/12.2, 12.6, 36, 74, 130, 55, 73 R, 87; D12/319, 325, 343

[56] References Cited

U.S. PATENT DOCUMENTS

| | | | |
|---|---|---|---|
| 1,780,410 | 11/1930 | Tupta | 244/87 |
| 2,377,835 | 6/1945 | Weygers | 244/23 C |
| 2,926,869 | 3/1960 | Sullivan | 244/36 |
| 2,935,275 | 5/1960 | Grayson | D12/325 |
| 2,955,776 | 10/1960 | Ziegler | 244/36 |
| 3,070,328 | 12/1962 | Price | 244/74 |
| 3,137,460 | 6/1964 | Owl, Jr. et al. | 244/73 R |

FOREIGN PATENT DOCUMENTS 982614  6/1951  France ................... 244/36

Primary Examiner—Galen L. Barefoot
Attorney, Agent, or Firm—Daniel J. Meaney, Jr.

[57] ABSTRACT

A shockcone and channeled disk-airframe having a top airfoil disk and lower airfoil disk comprising a wedge perimeter extending from the forward nose of a shockcone and therearound the leading edge to the trailing edge of an airframe body wherein the lower part of disk-airframe has a plurality of bottomwardly opened channels extending from the leading to the trailing edge whereto providing the channel walls. The disk-airframe has a plurality of inclined rudders operatively coupled to the vertical fins located rear on both sides of the top airfoil disk-airframe. The airframe is mushroom in sectional shape; the stem of the mushroom is the lower part of a disk-airframe and forms the depth of the fuselage and the walls of channels and the cap of the mushroom is the top airfoil disk which is convex from the wedge perimeter of the airframe within the upper part and providing the cargo space of a disk-airframe. The size of the channels is a minimum 50 percent of the width of the disk-airframe. The channel is parallel from the inlet to one third the length of the channel enabling the mounting of variable volume power plants which are producing a flattened thrust stream. Also, the channel is divergent from adjacent the end of power plant to the outlet of the channel to accommodate the expansion of the high velocity thrust stream passing through the diverging contours of the channel to produce an aerodynamic, lift-thrust generating system for the airframe.

6 Claims, 8 Drawing Figures

SHOCKCONE AND CHANNELED DISK-AIRFRAME

BACKGROUND OF THE INVENTION

1. Field of the Invention

This invention relates to the airframe for an aircraft and more particularly relates to the shockcone and channeled forward nose portion of the disk-airframe and wherein the main body is airfoil disk shape having a wedge perimeter extending from the nose and the leading edge to trailing edge of an airfram body. The airframe body includes a plurality of bottomwardly opened channels extending from forward to rearward at the lower portion of a disk-airframe enabling adaption of the power plants and the aerodynamic lift-thrust generating systems to be utilized internal of a disk-airframe wherein the disk-airframe has a plurality of inclined rudder operatively coupled to the vertical fin located rear on both sides of the top airfoil disk-airframe.

2. Description of the Prior Art

The use of the shockcone extending from the fuselage and having a plurality of external airfoil wings are known in the art. Typically the airframe generates a lift force on the external surface of an airframe for take-off and landing or uses an air cushion thrust stream for vertical take-off and landing.

SUMMARY OF THE PRESENT INVENTION

The present invention relates to a new and novel shockcone and channeled disk-airframe having a top airfoil disk and lower airfoil disk comprising a wedge perimeter extending from the forward nose of a shockcone and therearound leading edge to trailing edge of an airframe body wherein the lower part of disk-airframe has a plurality of bottomwardly opened channels from the leading to the trailing end of an airframe. A shockcone forms the forward nose of an airframe which is mushroom in sectional shape having a stem and cap of a mushroom. The mushroom sectional shape converges to form the nose of a shock cone. The cap of a mushroom is rear-wardly shaping to the top airfoil disk which is convex from the wedge perimeter of an airframe within the upper part providing the cargo space of a disk-airframe. The stem of mushroom is rearwardly shaping to form the fuselage in the lower part of a disk-airframe and depth of a fuselage is formed by the inner wall of the channels. The outer wall of the channels is provided by a half moon shaped lower part disk on both sides located under the cargo space of a disk-airframe.

The channels are parallel on the forward portion and extend to about one third the length of each channel. The variable volume power plants produce the flatten thrust stream. Also the shaping action of the channel is divergence from adjacent the end of power plant to the outlet of the channel and about two-thirds of the length of the channel is used to generate the aerodynamic lift-thrust generated by the flatten thrust stream. The flatten thrust stream produces the lift to offset the drag forces generated simultaneously during manuver of vertical take-off and landing. The aerodynamic lift thrust system also generates the forward thrust force during high speed flight of a disk-airframe.

A disk-airframe is shown having a plurality of inclined rudders operatively coupled to the conventional type of rigid vertical fin on the both sides rear-upper portion of a disk-airframe for controlling the flight of an airframe during high speed of a disk-airframe.

One advantage of the present invention is that the shockcone and channeled disk-airframe is simple to construct and avoids the long span wing structure while providing a large cargo space.

BRIEF DESCRIPTION OF THE DRAWING

The foregoing and other advantages and features of this invention will become apparent from the following description of the preferred embodiment, when considered together with the illustrations and accompanying drawings which includes the following Figures.

DESCRIPTION OF THE PREFERRED EMBODIMENT

Figure 1:
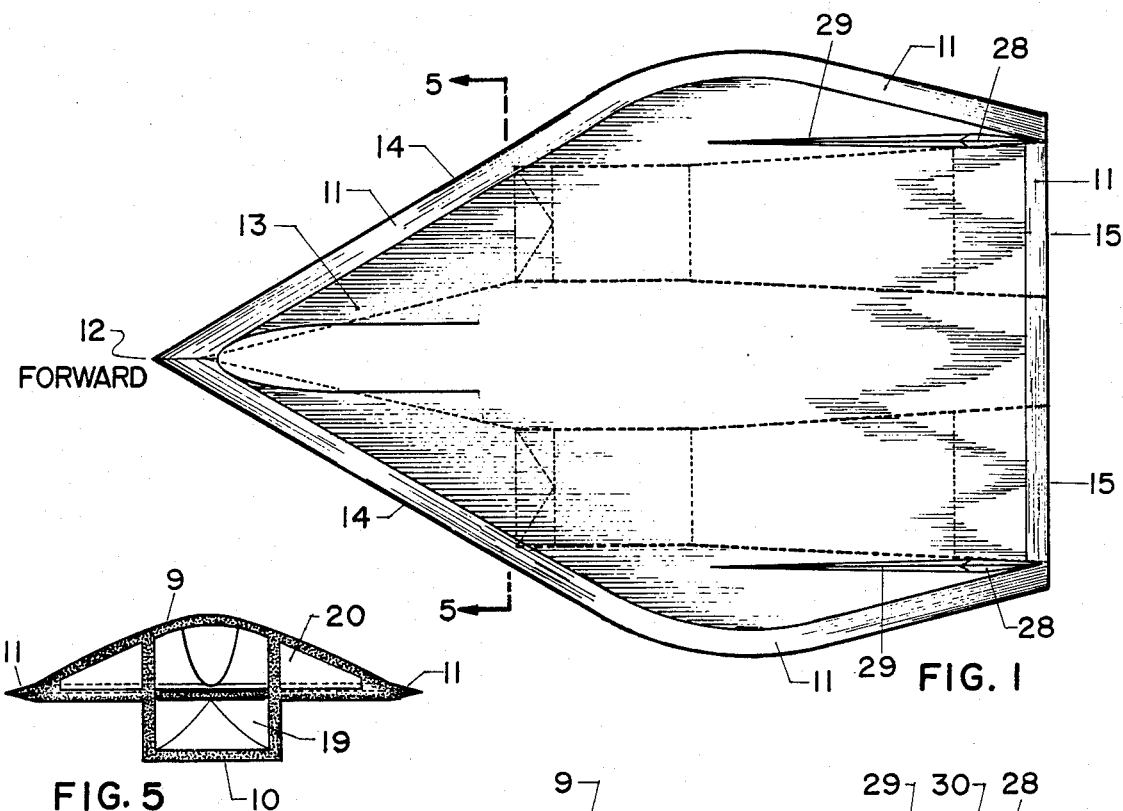
FIG. 1 is a top plan view of a shockcone and channeled disk-airframe showing that the forward of an airframe is shockcone in shape and extending from the main disk-airframe.

The shape mode of a shockcone and channeled disk-airframe is illustrated in FIGS. 1, 2, 3 and 4. An airframe having a top airfoil disk 9 and lower airfoil disk 10 is shown to comprise a wedge perimeter 11 extending from nose 12 of a shockcone 13 and the leading edge 14 to trailing edge 15 of an airframe body wherein the lower part of the disk-airframe has a plurality of bottomwardly opened channels 16 which extend from the leading edge 14 to trailing edge 15 to define the channel walls 17 and 17' and the ceiling 18. A shockcone 13 formed forward of an airframe which is mushroom in sectional shape having a stem 19 and cap 20. The mushroom sectional shape 19 and 20 forwardly converge on the nose 12 of a shockcone 13. The cap 20 extends to the top of airfoil disk 9 which is convex from the wedge perimeter 11 of an airframe having an upper part which define the cargo space 21 of a disk-airframe.

Figure 6:
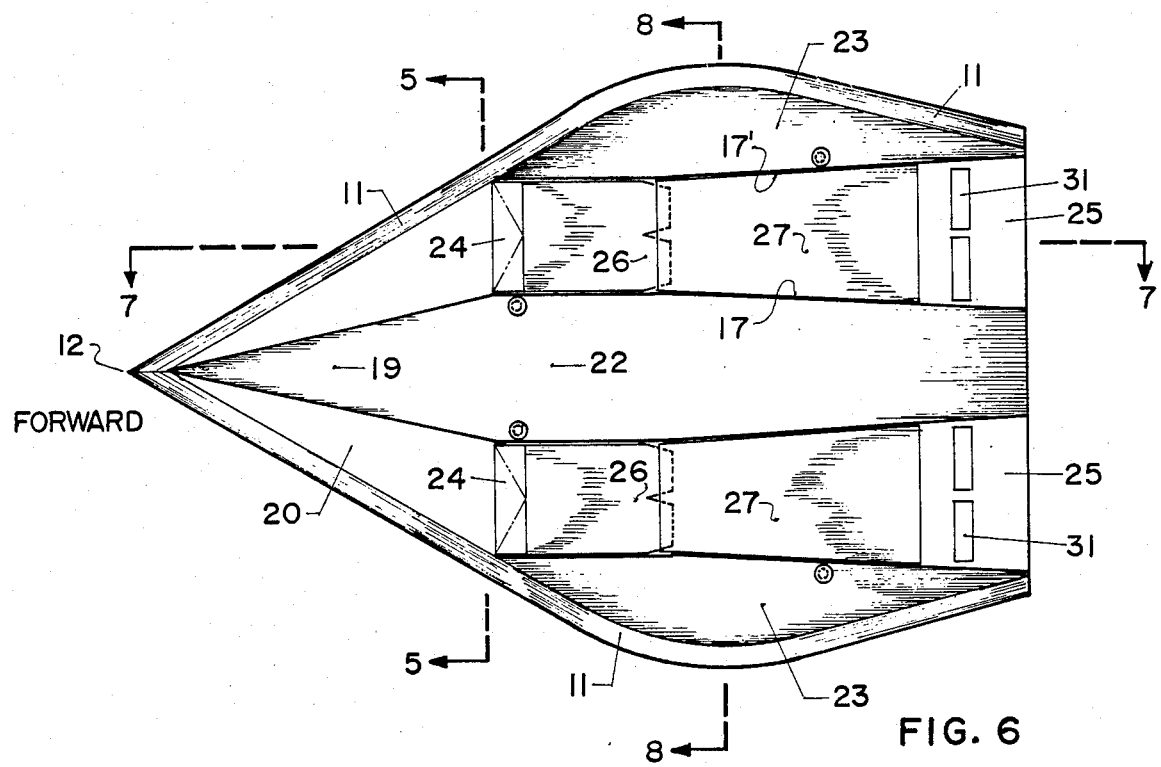
FIG. 6 is a reflected bottom plan view of a shockcone and channeled disk-airframe showing the channels are adapted to be the aerodynamic lift-thrust generating systems located on the lower part of the disk-airframe.

The stem 19 of the mushroom section is rearwardly shaping to the fuselage 22 in the lower part of the disk-airframe and the depth of a fuselage 22 is formed by inner wall 17 by channel 16. FIG. 6 shows the outer wall 17' of a channel is provided by a half moon 23 shaped lower part disk on both side tip portions located under the cargo space of a disk-airframe.

Figure 3:
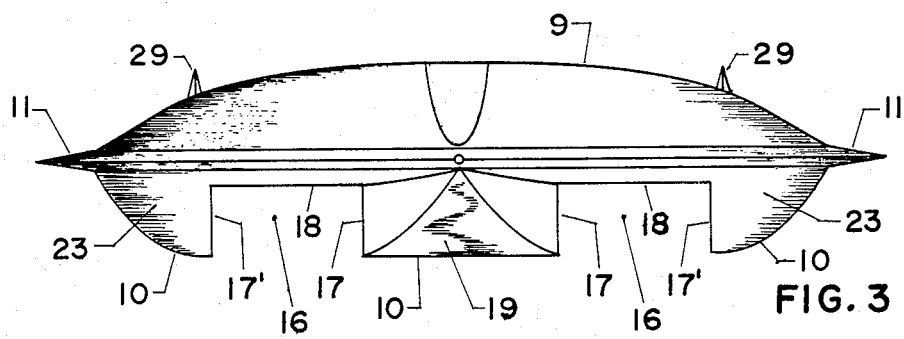
FIG. 3 is a front elevation of a shockcone and channeled disk-airframe showing the channels are located in the lower part of a disk-airframe.
Figure 4:
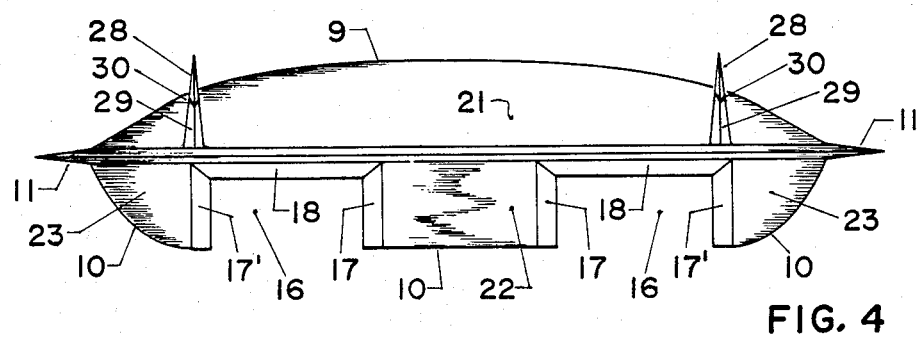
FIG. 4 is a rear elevation of a shockcone and channeled disk-airframe showing the divergent channels are located on the rear portion lower part of the disk-airframe and shows vertical fins being located in the upper part on both sides of the rear portion of the disk-airframe.
Figure 7:
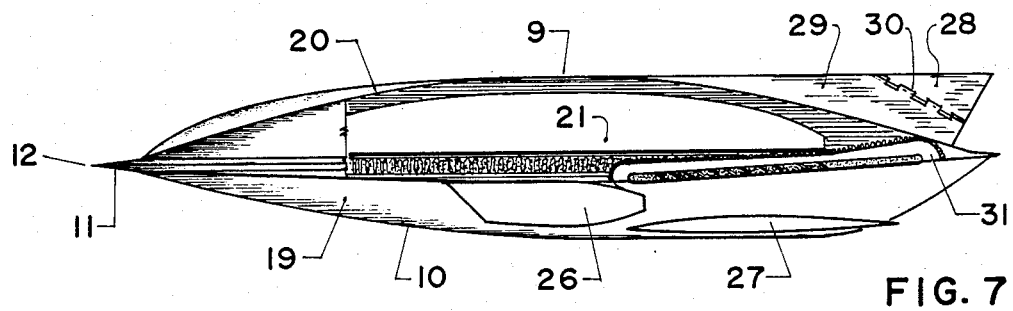
FIG. 7 is a sectional view taken along section lines 7—7 of FIG. 6.
Figure 8:
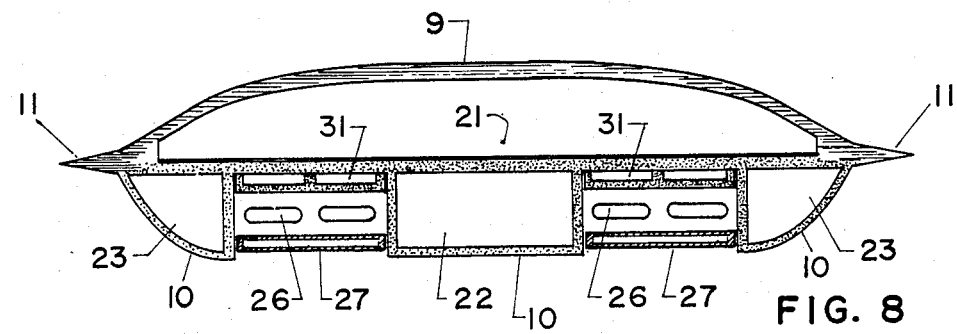
FIG. 8 is a sectional view taken along section lines 8—8 of FIG. 6.

The disk-airframe has a plurality of channels 16 positioned under the cargo space at lower part of an airframe and the channels are illustrated in FIGS. 6, 7 and 8. Each channel 16 has an inlet 24 located adjacent to the foward end and has an outlet 25 located at the rear of the disk-airframe, the number of channels is at least one each on both side of a fuselage 22 and the size of channels are minimum 50 percent of the width of the disk-airframe. The channel provides parallel flow from the forward inlet 24 to about one third the length of each channel as shown in FIGS. 3 and 6. The channels 16 are adapted to receive the variable volume power plants 26 which produce the flatten thrust stream. The channel flow is divergent from adjacent the end of power plant 26 to the outlet 25 which is about two thirds of the length of the channel as shown in FIGS. 4 and 6. The rear portions of each channel are downstreamwardly divergence and accommodate the expansion of the high velocity thrust stream passing through the diverging contours of a channel of the aerodynamic lift-thrust generating system 27. The channels pass the flatten thrust stream and produce the lift and the drag forces which are generated simultaneously during maneuver of a vertical take-off and landing. The aerodymanic lift-generating system 27 generates the forward thrust during high speed flight of a disk-airframe.

Figures 2, 5:
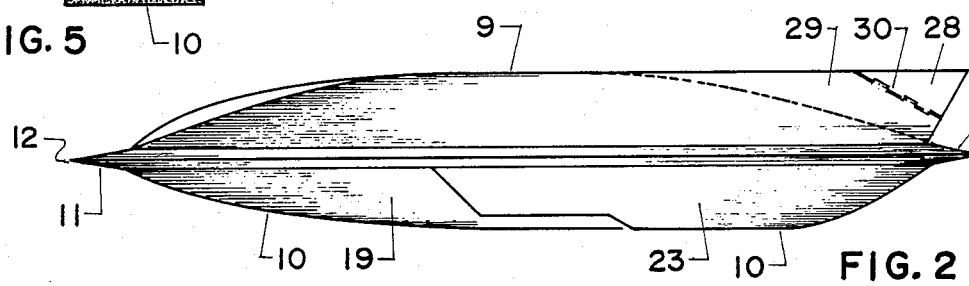
FIG. 2 is a side elevation of a shockcone and channeled disk-airframe showing that the top airfoil disk and lower airfoil disk forms a wedge perimeter from nose to trailing of an airframe and having inclined rudder hinged to vertical fin located rear-upper of a disk-airframe.
FIG. 5 is a sectional view taken along section lines 5—5 of FIG. 1.

The disk-airframe having a plurality of inclined rudders is illustrated in FIGS. 2, 4 and 7. The inclined rudders 28 are operatively coupled to the conventional type of flight control fin 29, which fins are located on the rear-upper sections on both sides of the top airfoil disk-airframe. The upper rear corner of each vertical fin is hinged 30 along a line which makes an angle with the horizontal. The inclined rudders 28 are used to control the pitch and the roll of the disk-airframe.

I claim:

1. A shockcone and channeled high speed flight disk-airframe comprising an airframe having a top airfoil disk and a lower airfoil disk which are joined around the periphery thereof to form a shockcone at the forward portion of the airframe wherein the shockcone is defined by a forward nose and a wedge perimeter wherein the wedge perimeter extends rearward from the foreward nose and defines a leading edge around the foreward portion of the airframe and a trailing edge rearward of the foreward portion of the airframe, said airframe having a plurality of spaced, elongated, substantially parallel, open channels formed in the lower airfoil disk wherein the channels extend therein from the forward nose rearward of the airframe to define in the lower airfoil and between the plurality of channels at least one elongated, substantially rectangular shaped surface extending rearward from the foreward nose, said shockcone having a cross-section area rearward of the forward nose which is mushroom shaped defining a cap of a mushroom and a stem of a mushroom wherein the cap thereof is located in the top airfoil disk and defines the upper portion of the shockcone and wherein the lower stem portion thereof defines the lower part of the airframe and shockcone with the depth of the lower part of the airframe being the length of the stem of the mushroom shaped cross-section and wherein the length of the stem likewise defines both the inner sidewalls for the channels and the depth of the lower portion of the lower airfoil disk extending between the channels;

said airframe having at least one channel located on each side thereof and with the cross-sectional areas of the channels together totaling at least fifty percent of the total cross-sectional area of the airframe, each of said channels defining an inlet located in the forward portion thereof and an outlet located at the rearward portion thereof, each of said channels including means for shaping the channel such that the forward approximate one-third thereof is adapted to receive and support a variable volume power plant which produces a flattened thrust stream and such that the rearward approximate two-thirds thereof defines an outlet channel which is divergent from the portion thereof adjacent the forward one-third and becomes a divergent contoured shape downstream thereof to accommodate expansion of a high velocity thrust stream passing through the diverging contoured shaped portion of the channel to produce an aerodynamic, lift-thrust generating system for the airframe.

2. The shockcone and channneled high speed flight disk-airframe of claim 1 wherein the top airfoil disk is rigidly affixed to the bottom airfoil disk forming an aerodynamic wedged shaped perimeter for the high speed airframe.

3. The shockcone and channeled high speed flight disk-airframe of claim 1 wherein the top airfoil disk defines a cargo space which extends rearward from the forward nose and wherein the part of the bottom airfoil disk between the channels defines a cargo space of the airframe which likewise extends rearward of the forward nose of the lower airfoil disk.

4. The shockcone and channeled high speed flight disk-airframe of claim 1 wherein the approximate one-third of each channel is adapted to receive and support a jet engine which is adapted to produce a jet thrust stream to generate lift and thrust forces for the airframe.

5. The shockcone and channeled high speed flight disk-airframe of claim 1 wherein the approximate two-third of each channel is formed with a diverging rear portion at the outlet thereof which is adapted to pass a jet thrust stream to generate lift and thrust forces for the airframe.

6. The shockcone and channeled high speed flight disk-airframe of claim 1 further comprising:

a plurality of inclined rudders each having a hinged flight stabilizer fin operatively coupled thereto at the upper-rear corner thereof so as to be moveable relative thereto along a line which makes an inclined angle towards the nose portion and which are adapted to control the pitch and roll of the airframe, said rudders being affixed to and extending in a substantially vertical position from the surface of the top airfoil disk and wherein at least one rudder is located on each side of the airframe.

* * * * *